US010331425B2

(12) United States Patent
Mount

(10) Patent No.: US 10,331,425 B2
(45) Date of Patent: Jun. 25, 2019

(54) AUTOMATED SOURCE CODE ADAPTION TO INJECT FEATURES BETWEEN PLATFORM VERSIONS

(71) Applicant: Google Inc., Mountain View, CA (US)

(72) Inventor: George Francis Mount, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/636,063

(22) Filed: Jun. 28, 2017

(65) Prior Publication Data

US 2019/0004774 A1 Jan. 3, 2019

(51) Int. Cl.
G06F 9/44 (2018.01)
G06F 8/41 (2018.01)
G06F 8/71 (2018.01)
G06F 8/76 (2018.01)

(52) U.S. Cl.
CPC .............. *G06F 8/41* (2013.01); *G06F 8/71* (2013.01); *G06F 8/76* (2013.01)

(58) Field of Classification Search
CPC .......................................................... G06F 8/41
See application file for complete search history.

(56) References Cited

U.S. PATENT DOCUMENTS

| 7,290,252 B2 | 10/2007 | Diedrich et al. |
| 2009/0164973 A1* | 6/2009 | Barnett ..................... G06F 8/41 717/110 |
| 2015/0012909 A1 | 1/2015 | Bohm et al. |
| 2015/0178054 A1* | 6/2015 | Delsart ..................... G06F 8/30 717/106 |
| 2018/0188914 A1* | 7/2018 | Chen ....................... G06F 9/454 |

OTHER PUBLICATIONS

Dig et al., "How do APIs evolve? A story of refactoring," Journal of Software Maintenance and Evolution: Research and Practice, Jan. 15, 2006, 26 pp.
Bruneton et al., "ASM: a code manipulation tool to implement adaptable systems," In Adaptable and extensible component systems, 2002 (Applicant points out, in accordance with MPEP 609.04(a), that the year of publication, 2002, is sufficiently earlier than the effective U.S. filing date, Jun. 28, 2017, so that the particular month of publication is not in issue), 12 pp.

(Continued)

*Primary Examiner* — Hanh Thi-Minh Bui
(74) *Attorney, Agent, or Firm* — Shumaker & Sieffert, P.A.

(57) ABSTRACT

In general, techniques are described by which a computing device may automate source code adaption to inject features between platform versions. The computing device may comprise a memory and a processor. The memory may be configured to store source code referencing a first application programming interface for a first version of a programming platform. The processor may be configured to automatically adapt the source code to reference a second application programming interface for a second version of the programming platform such that the source code maintains functionality of the first application programming interface for the first version of the programming platform, and output, based on the automatically adapted source code, an executable file.

17 Claims, 4 Drawing Sheets

(56) References Cited

OTHER PUBLICATIONS

"Support Library," Android Developers [online]. First Accessed on Apr. 7, 2017. Retrieved from the Internet:<https://developer.android.com/topic/libraries/support-library/index.html> 5 pp.

Nita et al., "Using Twinning to Adapt Programs to Alternative APIs," Proceedings of the 32nd ACM/IEEE International Conference on Software Engineering—vol. 1, May 1-8, 2010, pp. 205-214.

Hight, "Understanding the Android Support Library," MartianCraft [online]. Jun. 2, 2015. Retrieved from the Internet:<http://martiancraft.com/blog/2015/06/android-support-library/> 7 pp.

Wu et al., "Transforming Code with Compositional Mappings for API-Library Switching," 2015 IEEE 39th Annual International Computers, Software and Applications Conference, Jul. 1, 2015, 10 pp.

International Search Report and Written Opinion of International Application No. PCT/US2018/022450, dated Jul. 3, 2018, 16 pp.

* cited by examiner

AUTOMATED SOURCE CODE ADAPTION TO INJECT FEATURES BETWEEN PLATFORM VERSIONS

BACKGROUND

Software developers may write computer programs in human-readable source code that conforms to a particular syntax. By writing computer programs in human-readable source code, software developers may design and implement computer programs more efficiently than writing programs directly in machine readable code. To execute computer-programs that are initially written in human-readable source code, a compiler may transform the human-readable source code into machine-readable code, which may be interpreted by a virtual machine or executed directly by a particular computer processing unit (CPU) architecture. The compiler may generate the machine readable code for an application programming interface (API) provided for a particular version of a programming platform (which may refer to, as one example, an operating system). Typically, newer versions of the operating platform introduce new features that are usually inaccessible to older versions of the operating platform absent significant development on the part of the software developers to shim the features from the newer version of the programming platform to the older versions of the programming platform.

SUMMARY

Techniques of the disclosure are generally directed to a builder computing system to automatically adapt source code referencing an application programming interface (API) for a first version, e.g., a newer version, of a programming platform to reference an API for a second version, e.g., older version, of the programming platform while maintaining functionality of the API for the newer version of the programming platform. The builder computing system may adapt the source code in either a human-readable code form or in bytecode form (e.g., machine code generated after compilation). The automatic adaption of the source code may occur without much, if any, developer intervention to inject the functionality of the API for the newer version of the programming platform into the source code referencing the API for the older version of the programming platform. In this way, the techniques may generally improve productivity of software developers by reducing an amount time needed to build and deploy applications for different versions of a programming platform (which may refer to a platform for which a software developer is programming, such as a version of an operating system).

In one example, a method comprises receiving, by one or more processors of a computing device, source code referencing a first application programming interface for a first version of a programming platform, automatically adapting, by the one or more processors, the source code to reference a second application programming interface for a second version of the programming platform such that the source code maintains functionality of the first application programming interface for the first version of the programming platform, and outputting, by the one or more processors and based on the automatically adapted source code, an executable file.

In another example, a computing device comprises a memory configured to store source code referencing a first application programming interface for a first version of a programming platform, and one or more processors configured to automatically adapt the source code to reference a second application programming interface for a second version of the programming platform such that the source code maintains functionality of the first application programming interface for the first version of the programming platform, and output, based on the automatically adapted source code, an executable file.

In another example, a non-transitory computer-readable storage medium has stored thereon instructions that, when executed, cause one or more processors of a computing device to receive source code referencing a first application programming interface for a first version of a programming platform, automatically adapt the source code to reference a second application programming interface for a second version of the programming platform such that the source code maintains functionality of the first application programming interface for the first version of the programming platform, and output, based on the automatically adapted source code, an executable file.

In another example, an apparatus comprises means for receiving, by one or more processors of a computing device, source code referencing a first application programming interface for a first version of a programming platform, means for automatically adapting, by the one or more processors, the source code to reference a second application programming interface for a second version of the programming platform such that the source code maintains functionality of the first application programming interface for the first version of the programming platform, and means for outputting, by the one or more processors and based on the automatically adapted source code, an executable file.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
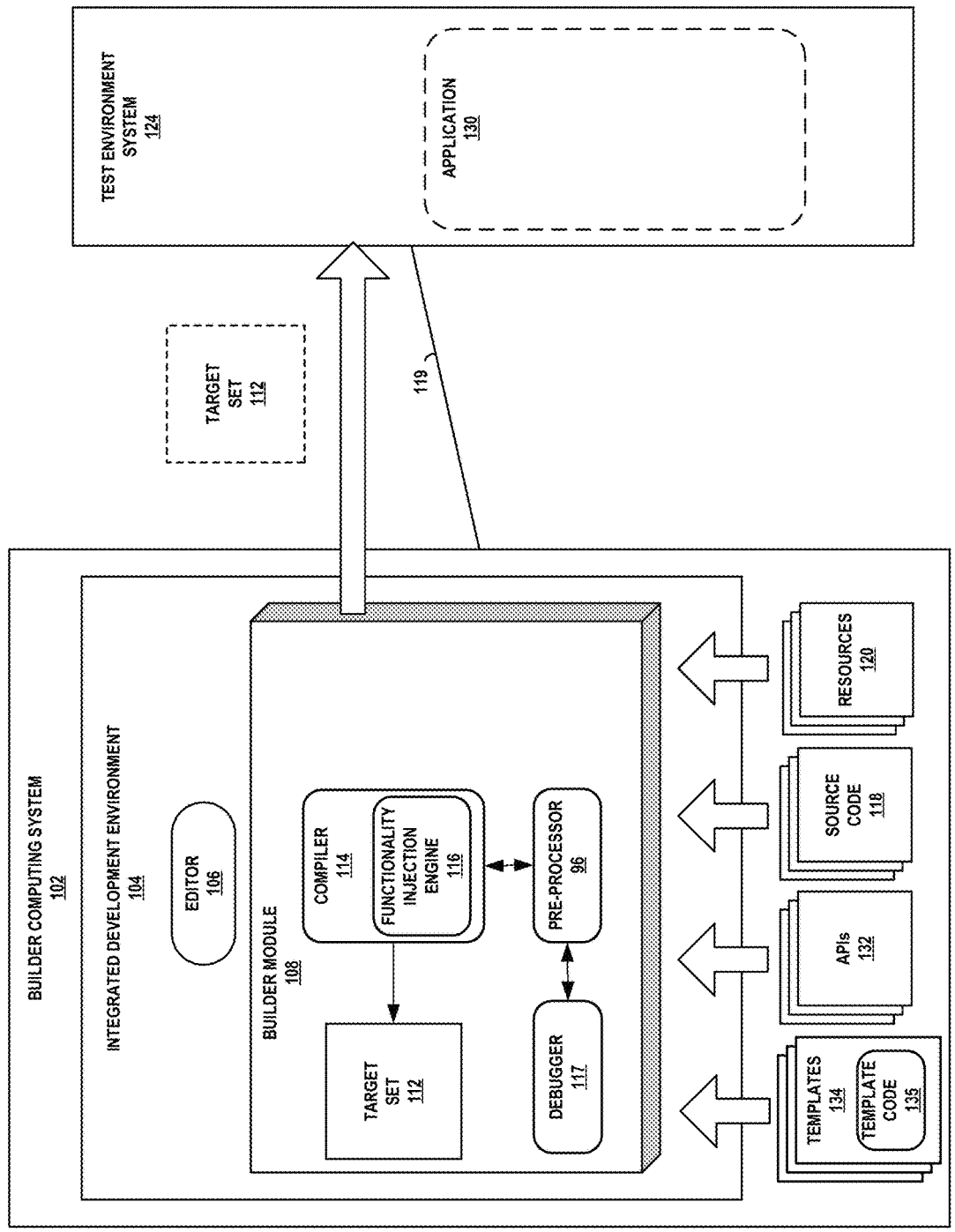
FIG. 1 is a conceptual diagram illustrating a builder computing system that may adapt source code to inject functionality between versions of programming platforms in accordance with various aspects of the techniques described in this disclosure.

FIG. 1 is a conceptual diagram illustrating a builder computing system 102 that may adapt source code to inject functionality between versions of programming platforms in accordance with various aspects of the techniques described in this disclosure. In the example of FIG. 1, builder computing system 102 may represent a desktop computer. However, in other examples, builder computing system 102 may represent a tablet computer, a smartphone, a laptop computer, workstation, server, or another type of computing device.

Builder computing system 102 may represent a computing device used by a software developer to write computer programs having source code, and compile the source code in an executable computer program (or, in other words, an executable file). In some examples, builder computing system 102 may represent a server that is accessed by a computing device of a software developer via a network to compile source code into a computer program. Although not shown in FIG. 1, builder computing system 102 may be configured to execute applications and/or modules in addition to builder module 108. For instance, computing device 102 may execute an operating system, web browser, command line terminal, or any other applications and/or modules that are executable by a computing device.

Builder computing system 102 may be configured to execute an integrated development environment (IDE) 104. IDE 104 may be implemented as hardware, software, or a combination of hardware and software. In some examples, IDE 104 is a software application that, when executed, provides a set of tools to design, debug, profile, and deploy applications, to name only a few examples. IDE 104, as shown in FIG. 1, includes an editor 106 and builder module 108. In some examples, one or more modules shown as implemented by builder module 108 may exist separately from builder module 108. In some examples, builder module 108 may implement other components not shown in builder module 108, such as a profiling tool to measure application performance or a modeling tool to visually represent and design components to provide only a few examples.

In some examples, editor 106 is a text editor. Text editor 106 may provide functionality for editing source code and other text. For instance, text editor 106 may include syntax highlighting, code-completion, refactoring, and/or code-generation functionality to provide only a few examples. Using text editor 106, a software developer may compose and edit source code 118 for an application 130. Application source code 118 may define controller logic, the model, and functionality of the presentation logic for application 130. In addition to source code 118, a software developer may also generate, assemble, or organize, application resources 120 that are included in application 130 or are used by builder module 108 to generate an application. Application resources 120 may include but are not limited to build scripts, source code or markup language that defines an appearance graphical user interface, and data files (e.g., text files, images, etc. included in the application).

Builder module 108 may receive one or more application resources 120 and source code 118, which builder module 108 may compile and/or assemble into one or more applications, such as application 130. Builder module 108 may include one or more sub-components to process and compile application resources 120 and application source code 118. For instance, as shown in FIG. 1, builder module 108 may include a preprocessor 96 and a compiler 114. Preprocessor 96 may perform preliminary analysis and/or transformations on source code 118 and/or resources 120 prior to compilation at compiler 114. For instance, pre-processor 96 may parse and/or transform layout files that define a particular visual layout for a graphical user interface or perform preliminary checks for dependencies or syntax errors. In some examples, pre-processor 96 may orchestrate or coordinate the build process based on one or more build scripts.

Builder module 108 may also include a compiler 114. Compiler 114 may compile human-readable source code, such as source code 118, into machine-executable code. For instance, compiler 114 may perform lexical analysis of human-readable source code 118. Lexical analysis may include dividing syntax elements of source code 118 into tokens. Each token may correspond to a symbol in a programming language, such as a keyword, variable, or number. Compiler 114 may also perform syntax analysis on the tokens. For instance, compiler 114 may generate a tree data structure, called a syntax or parse tree, which organizes the tokens based on the relationships between syntax elements that correspond to the tokens. Each node of the syntax tree may represent a token. As such, the syntax tree may represent the structure or organization of the computer program. Compiler 114 may also perform type checking on the syntax tree to determine whether one or more programming language requirements are violated.

Compiler 114 may convert human-readable source code 118 in a syntax tree into machine-independent intermediate code, while in other examples, compiler 114 may convert human-readable source code 118 into assembly language for a specific machine architecture. For purposes of this disclosure, machine-executable code may refer to machine-independent intermediate code or assembly language for a specific computer architecture. The machine-independent intermediate code may be executed by a runtime environment or virtual machine that has been compiled for a specific computer architecture, while assembly language for a specific machine architecture is executed directly by a processor having a particular computer architecture.

As shown in FIG. 1, builder module 108 includes debugger 117. Debugger 117 provides debugging functionality, such as single-stepping and breaking through execution of application 130. In some examples, debugger 117 may provide for inspection of values assigned to variables in application 130 during execution, such that a software developer can view the values.

Compiler 114 may generate a target set 112 that includes one or more targets. A target may be compiled or uncompiled. In some examples, a target is a single file. For instance, a target may be a file that includes a set of machine-executable code (e.g., "compiled target") compiled from human-readable source code 118. A compiled target may be referred to as an object definition in object-oriented programming. In some examples, a target may have a particular name and may be a logical grouping of machine-executable code. For instance, in the Java™ programming language, a compiled target may be a compiled class file (e.g., object definition) with the same name as a source file that defines the logic of the compiled class file.

In some examples, a target may be an uncompiled target. An example of an uncompiled target may be a resource that is accessed, integrated, or otherwise used with an application. For example, an uncompiled target may be an image, layout definition, color definition, or the like. When building application 130, builder module 108 may assemble a target set 112 that includes compiled and uncompiled targets that collectively represent application 130. For instance, application 130 may be a collection of compiled targets and uncompiled targets that are bundled into a single file called an application package, which may also be referred to as an "executable file."

As shown in FIG. 1, during the software development process, a software developer may interact with builder module 108 to compile source code 118 and assemble resources 120 into target set 112, which may be bundled by builder module 108 into an application package that represents application 130. Application 130 may be executed in test environment system 124 to observe or test functionality implemented in application 130. In FIG. 1, test environment system 124 is implemented as a separate computing device that is coupled to builder computing system 102 by a communication link 119. Examples of test environment system 124 may include, but are not limited to a tablet computer, a personal digital assistant (PDA), a laptop computer, server, desktop computer, a portable gaming device, a portable media player, an e-book reader, a smartwatch, television platform, a cellular communication device (including a so-called "smart phone") or another type of computing device. Communication link 119 may be a wired or wireless link that operably couples builder computing system 102 to user computing system 124.

Builder module 108 may deploy application 130 to test environment system 124 by sending a collection of compiled targets and uncompiled targets that represent application 130 to test environment system 124 via communication link 119. For instance, builder module 108 may deploy application 130 by sending an application package that represents application 130 to test environment 124.

Although test environment system 124 is implemented as a computing device separate from builder computing system 102 in FIG. 1, in some examples, test environment system 124 may be implemented at builder computing system 102. For instance, test environment system 124 may be an emulator that emulates a device running particular operating system, such as described in FIG. 2. In these and other examples, test environment system 124 executes at builder computing system 102 as hardware, software, or a combination of hardware and software. In some examples, test environment system 124 may be implemented as a virtual machine at builder computing system 102. In some examples, test environment system 124 may be one or more directories in a file system of builder computing system 102 that include or otherwise store the file or files representing application 130.

In the example of FIG. 1, application 130, after being built by builder module 106, is deployed to test environment system 124 for execution. For instance, builder module 108 may package target set 112 into a single file or set of files that builder module 108 sends to test environment system 124. Application 130 may include functionality to perform any of a variety of operations within test environment system 124. For instance, application 130 may be an email application, text messing application, instant messaging application, weather application, video conferencing application, social networking application, weather application, stock market application, emergency alert application, sports application, office productivity application, or multimedia player, to provide only a few examples.

The techniques of the disclosure generally enable compiler 114 to automatically adapt source code 118 referencing one of application programming interfaces (APIs) 132 ("APIs 132") for a first version, e.g., a newer version, of a programming platform to reference a different one of APIs 132 for a second version, e.g., older version, of the programming platform while maintaining functionality of the one of APIs 132 for the newer version of the programming platform. The automatic adaptation of the source code may occur without much if any developer intervention to inject the functionality of the one of APIs 132 for the newer version of the programming platform into source code 118 referencing the different one of APIs 132 for the older version of the programming platform. As such, the techniques may improve productivity of software developers by reducing the amount of time needed to build and deploy applications for different versions of a programming platform (which may refer to a platform for which a software developer is programming, such as a version of an operating system).

In operation, compiler 114 may compile source code 118 having references to functionality provided by the newer one of APIs 132 (which will be denoted as API 132N, although not shown as such in FIG. 1 for ease of illustration, and is representative of a first application programming interface for a first version of the programming platform). APIs 132 each represent a different interface by which to incorporate pre-defined functionality (e.g., in the form of subroutines, protocols, tools, and resources) provided by the programming platform into application 130. API 132N may provide added or improved functionality over older ones of APIs 132 (which will be denoted as API 132O, although not shown as such in FIG. 1 for ease of illustration, and is representative of a second application programming interface for a second version of the programming platform).

The software developer may specify, in source code 118 or other build resources (e.g., such as a manifest file), a target API and a minimum API. Given that compiler 114 may inject functionality from API 132N into source code 118 that only references API 132O without much, if any, user interaction consistent with the techniques of this disclosure and as described below in more detail, the software developer may specify the target API as API 132N, and the minimum API as API 132O. The software developer may interface with editor 106 to develop source code 118 using API 132N, imbedding references to functionality of API 132N in source code 118. Upon successful debugging of source code 118 using debugger 117, the software developer may interface with compiler 114 to compile the debugged version of source code 118.

In the example of FIG. 1, compiler 114 includes a functionality injection engine 116, which may inject functionality of API 132N into source code 118 consistent with the techniques of this disclosure. Functionality injection engine 116 may automatically adapt source code 118 in a variety of different ways to reference API 132O such that source code 118 maintains the functionality of API 132N.

During compilation, functionality injection engine 116 may examine source code 118 to identify any reference to functionality of API 132N that is not available in API 132O (where such references may be referred to as "unavailable references" in that such references to the functionality of API 132N are unavailable in API 132O). Functionality injection engine 116 may access one or more templates 134 identifying these unavailable references in source code 118 and catalog template code that will be used to replace the unavailable references in source code 118.

Compiler 114 may compile source code 118 with the references to API 132N into bytecode representative of an executable file (which is another way to refer to target set 112 which is representative of application 130 as noted above). During such compilation, functionality injection engine 116 creates the one or more templates 134. Although described as creating templates 134, functionality injection engine 116 may reference pre-existing templates 134 that were previously created prior to compilation.

After compiling source code 118 into the bytecode, functionality injection engine 116 may process templates 134 to adapt or otherwise manipulate the bytecode (which may be denoted as "bytecode 112" given that target set 112 represents, in part, the bytecode) to reference API 132O such that source code 118 maintains the functionality of API 132N. Although described as performing bytecode adaptation to injection the functionality of API 132N into API 132O, the techniques described in this disclosure may be applied with respect to source code 118 (e.g., adapting human-readable source code 118 rather than machine-readable bytecode 112).

Functionality injection engine 116 may adapt bytecode 112 in a number of different ways that involve replacing references in bytecode 112 to unavailable functionality of API 132N with references to template code 135 of one or more of templates 134. For example, source code 118 may invoke a function of API 132N that is unavailable in API 132O, where the function may be "unavailable" when it is entirely absent or modified in some way (e.g., to include additional inputs, to output values of a different type, etc.) relative to API 132O. That is, functionality injection engine 116 may determine that a function is "unavailable" when the reference to the function of API 132N would not compile when compiling with a target API set to API 132O.

Functionality injection engine 116 may replace the function call with a function call to a template function of a template class set forth in template code 135 that adds the functionality of the unavailable function of API 132N. Within the template function, functionality injection engine 116 may specify selection control code (e.g., a switch statement, or a series of if, else if, and/or else statements) that switches between different implementations of the functionality tailored for different ones of APIs 132O based on the version of the programming platform of the device, such as test environment system 124, executing bytecode 112. Functionality injection engine 116 may also include the original unavailable function call in the switch statement such that devices executing the newer version of the programming platform may access the functionality using API 132N rather than via template code providing such functionality (possibly inefficiently) via API 132O.

Functionality injection engine 116 may, in this way, introduce a redirection mechanism to insert selection control code that allows for multiple different implementations of the functionality using one or more APIs 132O, while also maintaining the original functionality for devices executing the newer version of the programming platform supporting API 132N. The redirection mechanism may modify bytecode 112 to replace function calls to unavailable functions with template code, which in this example may have a template function of template classes developed to redirect such function calls to appropriate functions calls corresponding to APIs for specific versions of the programming platform executed by test environment system 124.

In this respect, builder computing system 102 may output an executable file (e.g., bytecode 112 packaged in the form of application 130) utilizing API 132O for the older version of the programming platform that includes the functionality of API 132N for the newer version of programming platform without requiring extensive development of shims and other source code to import the functionality of the API 132N for the newer version to the older version of the programming platform. As such, builder computing system 102 may automate software development for multiple versions of programming platforms while maintaining the functionality (which is often desirable from the application user perspective) of the newer version of the programming platform across the various older versions of the programming platform.

The techniques may, in this way, facilitate feature adoption by the users of various versions of the programming platform, decreasing the impact of programming platform version fragmentation. Given that software developers generally develop applications for the most prevalent programming platform (e.g., in terms of percentage of devices executing each programming platform), functionality introduced in less prevalent, but newer, versions of the programming platforms may not be available to users of the older versions of the programming platform for significant amounts of time. As such, the techniques described in this disclosure may automate distribution of functionality to older versions, possibly more prevalent, versions of the programming platform to improve operation of the devices (in terms of providing better security, more efficient processing, view rendering and display, etc.).

Figure 2:
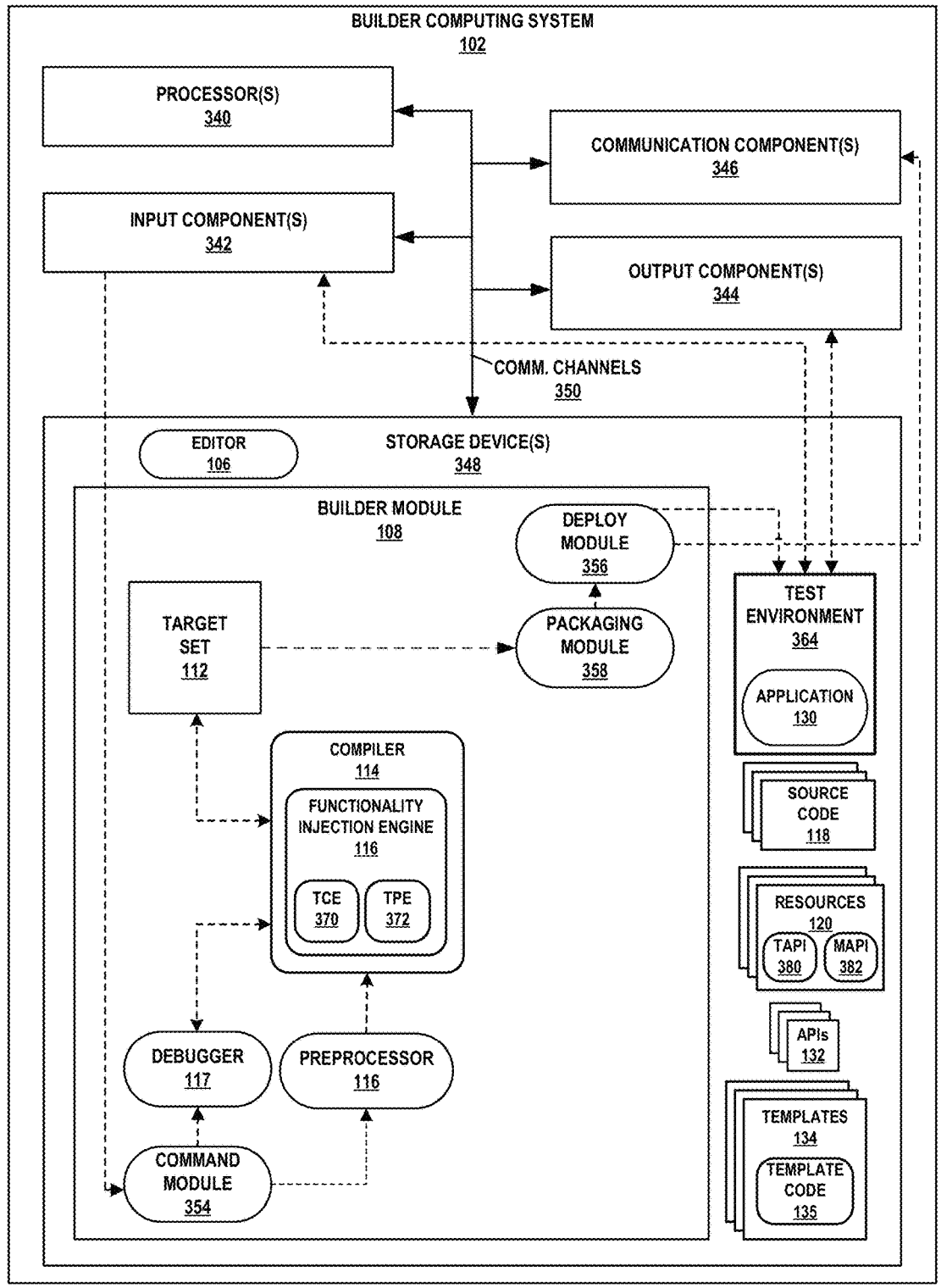
FIG. 2 is a block diagram illustrating builder computing device of FIG. 1 as an example computing device configured to perform an example software compilation and build process, in accordance with one or more aspects of the present disclosure.

FIG. 2 is a block diagram illustrating builder computing device 102 as an example computing device configured to perform an example software compilation and build process, in accordance with one or more aspects of the present disclosure. FIG. 2 illustrates only one particular example of builder computing device 102 and other examples of builder computing device 102 may exist. Builder computing device 102 of FIG. 2 may include a subset of the components included in builder computing system 102 of FIG. 1 and may include additional components not shown in FIG. 2.

In the example of FIG. 2, builder computing device 102 may be a desktop computing device although in other examples, builder computing device 102 may be a laptop, tablet computing device, server computing device or any other computing device capable of performing techniques of this disclosure. Builder computing device 102 may be a software development device configured to compile code as part of a build process for creating one or more executable files (which may also be referred to as "executable software applications"), such as an application package.

As shown in the example of FIG. 2, builder computing device 102 includes one or more processors 340, one or more input components 342, one or more output components 344, one or more communication components 346, and one or more storage components 348. Storage components 348 of builder computing device 102 includes builder module 108, target set 112, debugger 117, command module 354, compiler 114, preprocessor 116, deploy module 356, packaging module 358, test environment, 364, source code 118, editor 106, and resources 120.

Communication channels 350 may interconnect each of the components 340, 342, 344, 346, and 348 for inter-component communications (physically, communicatively, and/or operatively). In some examples, communication channels 350 may include a wired and/or wireless system bus, a wired and/or wireless network connection, an inter-process communication data structure, or any other method for communicating data between internal components of builder computing device 102.

One or more input components 342 of builder computing device 102 may receive input on behalf of the various other components and modules of builder computing device 102. For example, keyboard input from a user of device 102 at a text editor for writing application source code 118 and/or application resources 120. Examples of input are tactile, audio, and video input. Input components 342 of builder computing device 102, in one example, includes a presence-sensitive display, a touch-sensitive screen, a mouse, a keyboard, a voice responsive system, a video camera, a microphone or any other type of device for detecting input from a human or machine.

One or more output components 344 of builder computing device 102 may generate output for receipt by other computing devices, systems, and a user of device 102, e.g., a software developer. For example, one or more output components 344 may present a user interface of a text editor and/or integrated development environment at a display of output components 344 from which a user of device 102 can view application source code 326 and/or application resources 320. Examples of output are tactile, audio, and video output. Output components 344 of builder computing device 102, in one example, includes a presence-sensitive display, sound card, video graphics adapter card, speaker, cathode ray tube (CRT) monitor, liquid crystal display (LCD), light emitting diode (LED) display, organic light emitting diode (OLED) display, or any other type of device for generating output to a human or machine.

One or more communication units 346 of builder computing device 102 may communicate with external devices via one or more wired and/or wireless networks by transmitting and/or receiving network signals on the one or more networks. Examples of communication unit 346 include a network interface card (e.g. such as an Ethernet card), an optical transceiver, a radio frequency transceiver, a GPS receiver, or any other type of device that can send and/or receive information. Other examples of communication units 346 may include short wave radios, cellular data radios, wireless network radios, as well as universal serial bus (USB) controllers.

One or more processors 340 may implement functionality and/or execute instructions within builder computing device 102. For example, processors 340 on builder computing device 102 may receive and execute instructions stored by storage components 348 that execute the functionality of modules 106, 108 (and corresponding data and modules of builder module 108), and test environment system 364. These instructions executed by processors 340 may cause builder computing device 102 to store information within storage components 348 during program execution. Processors 340 may execute instructions of modules 106, 108 (and corresponding data and modules of builder module 108), and test environment system 364 to cause modules 106, 108 (and corresponding data and modules of builder module 108), and test environment system 364 to perform techniques of this disclosure. That is, modules 106, 108 (and corresponding data and modules of builder module 108), and test environment system 364 may be operable by processors 340 to perform various actions or functions of builder computing device 102 in accordance with techniques of this disclosure.

One or more storage components 348 within builder computing device 102 may store information for processing during operation of builder computing device 102 (e.g., builder computing device 102 may store data accessed by 106, 108 (and corresponding data and modules of builder module 108), and test environment system 364 during execution. In some examples, storage component 348 is a temporary memory, meaning that a primary purpose of storage component 348 is not long-term storage. Storage components 348 on builder computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 348, in some examples, also include one or more computer-readable storage media. Storage components 348 may be configured to store larger amounts of information than volatile memory. Storage components 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with modules 106, 108 (and corresponding data and modules of builder module 108), test environment system 364, source code 118, and resources 120.

Modules 106, 108 (and corresponding data and modules of builder module 108), and test environment system 364 may perform operations using hardware or a mixture of hardware and software (which may include firmware, middleware, etc.) residing in and executing on builder computing device 102. Builder computing device 102 may execute modules 106, 108 (and corresponding data and modules of builder module 108), and test environment system 364 with a single or multiple processors, such as processors 340. Builder computing device 102 may execute one or more of modules 106, 108 (and corresponding data and modules of builder module 108), and test environment system 364 as a virtual machine (VM) executing on underlying hardware components of builder computing device 102. In some examples, modules 106, 108 (and corresponding data and modules of builder module 108), and test environment system 364 may be arranged remotely to, and remotely accessible from, builder computing device 102, for instance, as one or more network services accessible by builder computing device 102 via a network cloud.

Initially, test environment system 124 may not include an application package for application 130 and builder computing system 102 may not include target set 112. To compile application 130 for the first time in a programming session, a software developer may provide a user input that causes builder module 108 to build and deploy application 130 in an initial build and deploy iteration. For instance, builder module 108 may include command module 354. Command module 354 may receive indications of user input from input components 342. For instance, if a user selects a visual icon in IDE 104 that corresponds to building and deploying an application, command module 354 may receive data that represents the user's selection to build and deploy the application. In other examples, if a user selects an icon in IDE 104 that corresponds to debugging an application, command module 354 may receive data that represents the user's selection to debug the application. In the example of FIG. 2, command module 354 receives data that represents the user's selection to build and deploy the application.

In response to receiving the indication of user input to build and deploy the application, command module 354 may send data to preprocessor 116 to perform any preprocessing operations on source code 118 and resources 120. Preprocessor 116 may determine a subset of source code files 118 and/or a subset of resources 120 that correspond to application 130 based, for example, on names of sources files and/or resources, or a project name or working set that specifies that source files and/or resources for application 130. After preprocessor 116 performs any preprocessing operations on source code 118 and resources 120, compiler 114 may compile source code from the sources files and any resources that may be compiled. For instance, compiler 114 may transform the human-readable source code for application 130 into machine-readable code, such as a set of compiled targets, e.g., target set 112.

Builder module 108 may include a packaging module 358, which may represent a module configured to package target set 112 into an executable file 130 (which is shown in the example of FIG. 2 as application 130). Builder module 108 may further include a deploy module 356. Deploy module 356 may represent a module configured to deploy application 130 to test environment 364, which may be included (e.g., integrated) within builder computing system 102 as shown in the example of FIG. 2. Test environment 364 may emulate a separate, dedicated hardware testing environment, such as that shown in the example of FIG. 1.

In accordance with various aspects of the techniques described in this disclosure, compiler 114 may compile source code 118 to generate target set 112 in such a manner that functionality of API 132N of the newer version of the programming platform is provided for API 132O of the older version of the programming platform. The software developer may code source code 118 using only references to API 132N, and interface with builder computing system 102, via input components 342, to compile source code 118. Builder computing system 102 may invoke compiler 114, which may transform source code 118 that only references API 132N of the newer version of the programming platform into bytecode 112. During compilation, compiler 118 may invoke functionality injection engine 116 to inject the functionality of API 132N into source code 118 using references to API 132O as described in more detail below.

When coding source code 118, the software developer may specify via resources 120 both a target API 380 ("TAPI 380) and a minimum API 382 ("MAPI 382"). Compiler 118 may access target API 380 and minimum API 382 from resources 120, passing target API 380 and minim API 382 to functionality injection engine 116 when invoking functionality injection engine 116 to inject the functionality of API 132N into source code 118 using references to API 132O.

As noted above, functionality injection engine 116 may create templates 134. To create templates 134, functionality injection engine 116 may invoke template creation engine 370 ("TCE 370"). Template creation engine 370 may create one or more of templates 134, each of templates 134 injecting functionality between two APIs 132 for successive versions of the programming platform. For example, assuming that target API 380 specifies the latest (or, in other words, newest) version of the programming platform, e.g., version 20 of the programming platform and that minimum API 382 specifies a previous version (or, in other words, older) version of the programming platform, e.g., version 18, template creation engine 370 may generate two of templates 134.

The first one of templates 134 may inject functionality from a corresponding one of API 132 (which is referenced above as API 132N) into source code 118 using references to an intermediate one of APIs 132 (which may be denoted as "API 132I," which is not shown in FIG. 2 for ease of illustration purposes) for an intermediate version of the programming platform, i.e., version 19 of the programming platform in this example. The second one of templates 134 may inject the functionality of API 132I into source code 118 using references to API 132O (which matches minimum API 382 in this example) for version 18 of the programming platform.

Template creation engine 370 may then merge each of templates 134 to generate a single one of templates 134 injecting the functionality of API 132N into the source code 118 using references both to API 132I and API 132O, allowing devices that support the newer version, the intermediate version, and the older version of the programming platform to utilize the functionality of the newer version of the programming platform. Template creation engine 370 may create and merge any number of templates 134, not just the example two templates described above.

In constructing one or more of templates 134, template creation engine 370 may determine each class to which support for API 132O is to be added, creating within templates 134 at least one corresponding template class. Template creation engine 370 may create the template class such that the template class extends the class to which templates 134 apply. Template creation engine 370 may annotate each template class with, as one example, "@SupportTemplate(<version>)," where <version> indicates a maximum API for which the corresponding one of templates 134 applies. For example, template creation engine 370 may generate the following template View class that extends a View class from API 132O to introduce the functionality of API 132N.

```
@SupportTemplate(Build.VERSION_CODES.OS23)
public class ViewSupportOS23 extends View {
    //...
}
```

When merging templates 134 having multiple different versions of the extended View class, template creation engine 370 may merge each version of the template View class (in this example) to create a single template 134 having a single template View class.

For newer fields only available in API 132N, template creation engine 370 may add the newer fields to templates 134 so as to support some methods or to add constants that are unavailable (e.g., do not exist) in API 132O. Template creation engine 370 may add private, protected, and/or public fields, copying the fields from API 132N to one or more of templates 134. The following provides an example of a field added to one or more of templates 134:

```
@SupportTemplate(Build.VERSION_CODES.OS23)
public class ViewSupportOS23 extends View {
    protected int foo;
}
```

Template creation engine 370 may add fields such that fields do not conflict with other template class versions. The following is an example of field conflict that template creation engine 370 may prohibit:

```
@SupportTemplate(Build.VERSION_CODES.OS21)
public class ViewSupportOS21 extends View {
    private int mFoo;
}
@SupportTemplate(Build.VERSION_CODES.OS19)
public class ViewSupportOS19 extends View {
    private int mFoo;
}
```

In the example directly above, the mFoo field is defined twice, resulting in a conflict. Template creation engine 370 may detect field collisions such as that shown above, and potentially rename colliding fields.

Template creation engine 370 may create templates 134 such that templates 134 may access constants from any version, but not dynamic fields from other implementations. Template creation engine 370 may allow references by templates 134 to fields that are accessible from the corresponding target APIs. For example, ViewSupportOlderAPI may access any public or protected fields added to View for API 132O and earlier.

With regard to static functions (which may also be referred to as "software static methods"), template creation engine 370 may add static functions to the extended template class as a replacement for any static function calls. An example of how template creation engine 370 may create replacement static functions is shown below.

```
@SupportTemplate(Build.VERSION_CODES.OS15)
public class ChoreographerOS15 extends Choreographer {
    public static ChoreographerCompat getInstance( );
}
```

With respect to instance functions (which may also be referred to as "software instance methods"), template creation engine 370 may add instance functions to one or more of templates 134. When a signature of an instance template function matches a signature of an instance function of API 132N, template creation engine 370 may add the instance template function using an override operator to override operation of the instance function of API 132N. The signature may refer to a name of the process, and the number and type of the parameters of the process. When the instance function cannot be overridden because of a name change (or a change in the name and/or type of the parameters of the instance process), template creation engine 370 may add a replacement template function to templates 134, annotating the replacement template function with an replace operator (e.g., @ReplaceMethod in the below example) with the function name of API 132N as a parameter.

```
@SupportTemplate(Build.VERSION_CODES.OS17)
public class ViewGroupOS17 extends ViewGroup {
    @ReplaceMethod("getOverlay")
    public ViewGroupOverlayCompat getOverlayCompat( ) {
        //...
    }
}
```

In the above example, the getOverlay( ) function cannot be overridden with a function returning a different type, resulting in template creation engine 370 creating a new template function having a name of getOverlayCompat( ).

The foregoing is also applicable to final functions (which may also be referred to as "final software methods"). An example of template creation engine 370 creating a final function in the manner discussed above with respect to instance functions is shown below.

```
@SupportTemplate(Build.VERSION_CODES.OS23)
public class ViewSupportOS23 extends View {
    @ReplaceMethod("cancelDragAndDrop")
    public final void cancelDragAndDropM( ) {
    }
}
```

With respect to signature differences, the signatures of the functions of API 132N and template functions may not match. When the name of the template function can remain the same as that of the function of API 132N, template creation engine 370 may not utilize the foregoing discussed annotation. Any differences in the parameters may be automatically determined by support class substitutions.

In some instances, template creation engine 370 may inject behavior into functions (which may also be referred to as "function behavior injections") so as to change functions to performing something earlier or later during execution. For example, when template creation engine 370 adds clip bounds to the Views class, template creation engine 370 may change the onDraw method to clip before drawing and reset the clip after drawing.

In these and other instances, when an overridden function exists in target API 380, template creation engine 370 may modify the overridden function to insert a call to the subclass when the super.process( ) call is made. The foregoing is illustrated in the following example below.

```
@SupportTemplate(Build.VERSION_CODES.OS17)
public class ViewOS17 extends View {
    private Rect mClipBounds;
    @Override
    public void setClipBounds(Rect clipBounds) {
        mClipBounds = clipBounds;
    }
    public void onDraw(Canvas canvas) {
        int saveCount = -1;
        if (mClipBounds != null) {
            saveCount = canvas.save(Canvas.CLIP_SAVE_FLAG);
            canvas.clipRect(mClipBounds);
        }
        super.onDraw(canvas);
        if (mClipBounds != null) {
            canvas.restoreToCount(saveCount);
        }
    }
}
```

Like fields, template creation engine 370 may create the template such that functions can only reference functions in the API supported by the template.

For constructors, template creation engine 370 may add constructors from API 132N that do not exist in API 132O to one or more of templates 134. For example, the constructors referenced below may be added to one or more of templates 134.

```
@SupportTemplate(Build.VERSION_CODES.OS19W)
public class ViewOS19W extends View {
    public ViewOS19W(Context context) {
        super(context);
    }
    public ViewOS19W(Context context, AttributeSet attrs) {
        super(context, attrs);
    }
    public ViewOS19W(Context context, AttributeSet attrs, int defStyleAttr) {
        super(context, attrs, defStyleAttr);
    }
    public ViewOS19W(Context context, AttributeSet attrs, int defStyleAttr,
            int defStyleRes) {
        super(context, attrs, defStyleAttr);
    }
}
```

Template creation engine 370 may define the last constructor denoted ViewOS19 W in terms of the constructors that exist in API 132O. In some instances, templates may not use "this( . . . )" calls.

When a constructor does not match a templated super class constructor, template creation engine 370 may add template code to describe which constructor in the super class should be called, as demonstrated in the following table.

```
@SupportTemplate(1)
public class MediaController1 extends MediaController {
    public MediaController1(Context context, AttributeSet attrs) {
        super(context, attrs);
    }
    public MediaController1(Context context, boolean useFastForward) {
        super(context);
    }
    public MediaController1(Context context) {
        super(context);
    }
}
```

Template creation engine 370 may generate the above class having a constructor using the useFastForward call super( ) with all parameters, but may initialize using the View Template's single context constructor.

In processing attributes, template creation engine 370 may add attributes for the given version in the @SupportTemplate annotation. Template processing engine 372 may copy the attribute from the corresponding class in the attrs.xml file. For example, prior to operating system (OS) version 21 ("OS21"), a Vector Drawable attribute was not available, so any usage of OS21:background will not compile. As such, template creation engine 370 may add the background attribute that it can be replaced for OS version 20 ("OS20") and earlier as shown in the following example.

```
@SupportTemplate(version = Build.VERSION_CODES.OS19,
    attributes = {"background"})
public class ViewSupportOS19 extends View {
}
```

Template creation engine 370 may also, when a class is missing in the minimum supported API 382, update source code 118 to reference a support library version of the class instead of the missing class. For example, the PointerIcon class is only supported in OS24 and above. Template creation engine 370 may generate template code that replaces the PointerIcon class with a support library version denoted as "PointerIconCompat" class. When the minimum API 382 is OS 24 or above, template creation engine 370 will not perform the substitution. Template creation engine 370 annotates source code 118 to note the substitution as follows.

```
@SupportClass(PointerIcon.class)
public class PointerIconCompat {
    // ...
}
```

@SupportClass may optionally take a parameter "version" that indicates the final version for which template creation engine 370 performs the substitution. The version parameter may be useful when certain versions have bugs or other errors and the class should be substituted even after it was introduced. By default, template creation engine 370 will note that the class is to be substituted until the last version in which an API was added for the framework class.

Template creation engine 370 may, when substituting classes, convert static functions to and from framework classes when such static functions are to be used in combination with replacement classes. The following example illustrates the conversion.

```
@SupportClass(PointerIcon.class)
public class PointerIconCompat {
    // ...
    public static PointerIconCompat convert(PointerIcon pointerIcon)
    {...}
    public static PointerIcon convert(PointerIconCompat pointerIcon)
    {...}
}
```

When replacement classes are used with versions that support frameworks, template creation engine 370 generates template code that calls the conversion function to call the framework versions. For example, a View support library template class for OS23 would have the following template code.

```
public void setPointerIcon(PointerIconCompat pointerIcon) {
    mPointerIcon = pointerIcon;
}
```

Template creation engine 370 may generate the following class with the setPointerMethod.

```
public void setPointerIcon(PointerIconCompat pointerIcon) {
    switch (Build.VERSION.SDK_INT) {
        case 0:
            ...
        case 23:
            mPointerIcon = pointerIcon;
            return;
        default:
            setPointerIcon(PointerIconCompat.convert(pointerIcon));
            return;
    }
}
```

In this way, template creation engine 370 may generate templates 134, which may include one or more of the foregoing examples of template code 135. Template creation engine 370 may, upon completion of one or more templates 134, interface with template processing engine 372 to process templates 134.

Template processing engine 372 may utilize a compilation tool referred to as "ASM," which may refer to a code manipulation tool used for implementing adaptable systems. ASM is not an acronym and merely represents a reference to the _asm_ keyword in the C programming language, which allows some functions to be implemented in assembly language.

Template processing engine 372 may process templates 134 in two stages. During the first stage, template processing engine 372 may catalog all of templates 134 in a particular support library. During the second stage that occurs during compilation of source code 118, template processing engine 372 may generate classes and interfaces based on target API 380 and all of templates 134 referenced in source code 118. Template processing engine 372 may process only templates 134 marked between minimum API 382 and target API 380 (except to examine super( ) calls in constructors as discussed in more detail above).

In the first stage of processing templates 134, template processing engine 372 may catalogue one or more of templates 134 and store metadata into an extensible markup language (XML) file used during the second stage of processing templates 134. Template processing engine 372 may perform the first stage during template module compilation (and may perform such first stage processing incrementally). The XML file may include a list of all template classes, the target framework classes for the template classes, and versions. The XML file may also include support classes, and attribute replacements for each version.

During the second stage of processing templates 134, template processing engine 372 may read the metadata from the XML file and modify source code 118 (and, in this example, the bytecode resulting from compiling source code 118). Template processing engine 372 may also, during the second stage, gather all of templates 134 (at least those marked as being between target API 380 and minimum API 382) and generate the classes and interfaces. The second stage processing may only occur once, unless template libraries or minimum API 382 change. Application classes and the XML, file may be processed incrementally.

Template processing engine 372 may generate an interface for each class extended by a template class. The generated interface may include all constants and public instance methods form all templates extending that class. Template processing engine 372 may generate the interface within the package OS.support.injected.<package>, where <package> may be a placeholder for the package of the extended class. Template processing engine 372 may name the interface using the name of the class prefixed by "I." For example, the View class will have an interface generated as OS.support.injected.OS.view.IView. Template processing engine 372 may generate a class that implements IView for all framework classes that extend View.

The generated interface may include all public function calls (or, in other words, public software method calls) that are in the templates that are not used to replace functionality, thereby making function calls possible without extending the same base class. For example, the View template code may supply a getClipBounds( ) function for OS17 and earlier. Template processing engine 372 may change a View.getClipBounds( ) function call to a IView.getClipBounds( ) function call so that the generated class extending TextView will also support the same getClipBounds function call.

When a templated class extends another templated class, template processing unit 372 may define an interface for that class that extends the interface of the base template. For example, template processing unit 372 may generate an ITextView interface that extends the IView interface.

Template processing unit 372 may also generate classes in a package OS.support.injected.<package> for every class that the template extends, where <package> is the package of the extended class. The class may extend the same class as the template. Template processing engine 372 may merge multiple templates into the same class and implement the generated, through the merge, interface. For example, template processing engine 372 may generate the following class generated for View.

```
package OS.support.injected.OS.view;
public class View extends OS.view.View implements IView {
    //...
}
```

Template processing engine 372 may merge all functions from all of templates 134 (meaning those between target API 380 and minimum API 382) to the generated single class.

When there are conflicting implementations for template processes, template processing engine 372 will override implementation of templates from super classes for later versions and subclasses. For example, when a template of the View class adds a getClipBounds( ) process, and the template for a TextView class also has a version for a getClipBounds( ) process, the implementation of the getClipBounds function for the TextView class is used.

When processing templates 134, template processing engine 372 may also process the above noted resources, loading the public.xml and attrs.xml files. Template processing engine 372 may add any attributes introduced after minimum API 382 to attrs.xml. Likewise, template processing engine 372 may extract any attributes from @SupportTemplate annotated sections of templates 134 and specify the extracted attributes in the attrs.xml file.

Template processing engine 372 may access a directory describing all classes, fields, and functions and documenting in which of APIs 132 each of the classes, fields and functions first appeared. For example, template processing engine 372 may access an XML file representing the directory at platform-tools/api/api-versions.xml. Template processing engine 372 may use the api-versions.xml file to identify all framework classes that extend classes with templates, where each class is examined and, if a template applies to that class, template processing engine 372 creates the template interface and class code (e.g., as part of template code 135).

As generally noted above, template processing engine 372 may first generate an interface for a templated framework class. Template processing engine 372 may generate and interface for every framework class to which a template applies. The interface may extend the interface generated for the superclass. The interface may include all public instance functions by way of extending the framework class.

With regard to fields, template processing engine 372 may copy fields directly into each generated class as shown in the example below.

```
@SupportTemplate(Build.VERSION_CODES.OS24)
public class ViewOS24 extends View {
    private boolean mRevealOnFocusHint = true;
    //...
}
@SupportTemplate(Build.VERSION_CODES.OS14)
public class TextViewOS24 extends Textview {
    private int mMinHeight;
    private int mMinWidth;
    //...
}
@SupportTemplate(Build.VERSION_CODES.OS16)
public class TextViewOS16 extends Textview {
    private int mTotalPaddingEnd;
    //...
}
```

Template processing engine 372 may generate the following View and TextView classes based on the foregoing.

```
public class View extends OS.view.View{
    private boolean mRevealOnFocusHint = true;
}
public class Textview extends OS.widget.Textview {
    private boolean mRevealOnFocusHint = true;
    private int mMinHeight;
    private int mMinWidth;
    private int mTotalPaddingEnd;
}
```

For functions of template classes, template processing engine 372 may copy template code 134 defining the functions from templates 134 to the generated class without a function body. Template processing engine 372 may next map from the template class to the generated class for later reference in function bodies. After mapping the processes, template processing engine 372 may add or create the bodies. For each process, template processing engine 372 may add selection control logic (e.g., a switch statement, or a series of if, if-else, and/or else statements, etc.) that switches between various code fragments based on the version of the programming platform (as defined, for example, by Build.VERSION.SDK_INT).

The following illustrates one example of the above process.

```
public class View extends OS.view.View{
    private boolean mRevealOnFocusHint = true;
}
public class Textview extends OS.widget.Textview {
    private boolean mRevealOnFocusHint = true;
    private int mMinHeight;
    private int mMinWidth;
    private int mTotalPaddingEnd;
}
```

For versions that have templates, template processing engine 372 may copy the body of the function from templates 134 into the function for the generated class. When the function is an override process, template generation engine 372 may generate a super.process( ) call as the default actions for the selection control logic. In some instances, generating the super.process( ) call may require a support class conversion, and template generation engine 372 may perform the support class conversion for the default condition of the selection control logic.

When multiple classes have template bodies for the same process, template processing engine 372 may use the most subclass template. Template processing engine 372 may code superclass implementations using the suffix of the class name. When a super.process( ) call is made, template processing engine 372 may call the superclass method instead as shown in the following two examples of templates 134.

```
@SupportTemplate(Build.VERSION_CODES.OS16)
public class ViewSupportOS16 extends View {
    private Rect mClipBounds;
    public void setClipBounds(Rect clipBounds) {
        mClipBounds = clipBounds;
    }
}
@SupportTemplate(Build.VERSION_CODES.OS23)
public class TextViewSupportOS23 extends Textview {
    public void setClipBounds(Rect clipBounds) {
        if (clipBounds == null || clipBounds.isEmpty( )) {
            super.setClipBounds(null);
        } else {
            super.setClipBounds(clipBounds);
        }
    }
}
```

However, the TextViewSupportOS23 implementation does not provide an adequate result.

Template processing engine 372 may generate the implementation for TextView as shown in the following table.

```
public class Textview extends OS.widget.Textview {
    private Rect mClipBounds;
    public void setClipBounds(Rect clipBounds) {
```

```
switch (Build.VERSION.SDK_INT) {
    case 1:
        ...
    case 24: {
        if (clipBounds == null || clipBounds.isEmpty( )) {
            setClipBoundsView(null);
        } else {
            setClipBoundsView(clipBounds);
        }
        return;
    }
    default: {
        super.setClipBounds(clipBounds);
        return;
    }
}
}
public void setClipBoundsView(Rect clipBounds) {
    case 1:
        ...
    case 18: {
        mClipBounds = clipBounds;
        return;
    }
    default:
        super.setClipBounds(clipBounds);
        return;
    }
}
}
```

For function injecting behavior noted above, template processing engine 372 may generate at least one extra process, suffixed by $Override. Within the body of the injected behavior, template processing engine 372 may replace all super.process( ) calls with the process$Override( ) call, which will internally call super.process( ). Template processing engine 372 may change the function name of all classes overriding the behavior to process$Override as shown in the following example.

```
@SupportTemplate(Build.VERSION_CODES.OS17)
public class ViewOS17 extends View {
    private Rect mClipBounds;
    //...
    @Override
    protected void onDraw(Canvas canvas) {
        boolean saved = mClipBounds != null;
        int saveCount = 0;
        if (saved) {
            saveCount =
canvas.save(Canvas.CLIP_SAVE_FLAG);
            canvas.clipRect(mClipBounds);
        }
        super.onDraw(canvas);
        if (saved) {
            canvas.restoreToCount(saveCount);
        }
    }
}
```

The table directly above, when processed by template processing engine 372, may result in the following generated class.

```
public class View extends OS.view.View {
    private Rect mClipBounds;
    //...
    @Override
    protected void onDraw(Canvas canvas) {
        boolean saved = mClipBounds != null;
        int saveCount = 0;
```

```
        if (saved) {
            saveCount =
 canvas.save(Canvas.CLIP_SAVE_FLAG);
                canvas.clipRect(mClipBounds);
        }
        onDraw$Override(canvas);
        if (saved) {
            canvas.restoreToCount(saveCount);
        }
    }
    protected void onDraw$Override(Canvas canvas) {
        super.onDraw(canvas);
    }
}
```

In source code 118, template processing engine 372 may modify the following custom View to that shown in the table directly below the first table.

```
public class CustomView extends View {
    @Override
    protected void onDraw(Canvas canvas) {
        // Do some drawing
        super.onDraw(canvas);
        // Do some drawing
    }
}
public class Customview extends View {
    @Override
    protected void onDraw$Override(Canvas canvas) {
        // Do some drawing
        super.onDraw$Override(canvas);
        // Do some drawing
    }
}
```

When multiple templates inject behavior into the same process, template processing engine 372 resolves the templates from superclass to subclass, and from oldest version of the programming platform to newest version of the programming platform. Template processing engine 372 creates each implementation of the injected behavior as a separate method with an index indicating the order of that implementation relative to the other implementations. The following table shows what template processing engine 372 generates when there are templates for View at APIs 132 for versions 17 and 20 of the programming platform, and TextView at APIs 132 for version 20 of the programming platform.

```
public class View extends OS.view.View {
    @Override
    protected void onDraw(Canvas canvas) {
        // Code copied from View 17 template
        // ...
        onDraw$1(canvas);
        // ..
    }
    protected void onDraw$1(Canvas canvas) {
        // Code copied from View 21 template
        // ...
        onDraw$2(canvas);
        // ..
    }
    protected void onDraw$2(Canvas canvas) {
        // Code copied from Textview 20 template
        // ...
        onDraw$Override(canvas);
        // ..
    }
    protected void onDraw$Override(Canvas canvas) {
```

```
        super.onDraw(canvas);
    }
}
```

When processing constructors, template processing engine 372 may copy the signatures of all class constructors into the generated class and match against the template classes. Template processing engine 372 may initialize the data field with a constructed instance. For the bodies of the constructions, template processing engine 372 may copy, other than with respect to the super( ) call, template code 134 into the generated classes, starting from the supermost class to the submost class, and going from the API for the oldest version of the programming platform to the API for the newest version of the programming platform.

For each templated class, template processing engine 372 ensures there is a matching constructor in templates 134. For example, assuming a View class exists with a constructor named Crazy, as shown in the following example.

```
public class Crazy extends View {
    public Crazy(Context context, int value) {
        //...
    }
}
```

In this example, template processing engine 372 may determine that no constructor for View matches the signature shown above, and as such template processing engine 372 analyzes templates 134 to identify a constructor in template code 135 matching the above signature. Template processing engine 372 may locate the @SuperTemplate annotation in templates 134, where the @SuperTemplate identifies which constructor in the superclass should be used as shown in the below example.

```
@SupportTemplate(Build.VERSION_CODES.BASE)
public class Crazy1 extends Crazy {
    @SuperTemplate(Context.class)
    public Crazy1(Context context, int value) {
        super(context, value);
    }
}
```

In this example, template processing engine 372 uses the constructor of the View template that takes a Context input. When the arguments need to be reordered, template processing engine 372 may specify additional parameters in the zero-indexed "order" attribute as shown below.

```
@SupportTemplate(Build.VERSION_CODES.BASE)
public class Crazy1 extends Crazy {
    @SuperTemplate(value = { Context.class, AttributeSet.class },
        order = { 1, 2 })
    public Crazy1(int value, Context context, AttributeSet attrs)
{
        super(value, context, attrs);
    }
}
```

In some example, only reordering is supported, and template processing engine 372 does not modify parameters when passing to the super call. In these and other examples, template processing engine 372 may check constructors with fewer parameters so that SuperTemplate may rarely be required.

Some constructors may only be available in certain ones of APIs 132 corresponding to certain versions of the programming platform, and therefore may be referred to as API-specific constructors. To illustrate, consider the following example in which View added the four-argument constructor in OS21.

```
public View(Context context, AttributeSet attrs,
       int defStyleAttr, int defStyleRes)
```

A generated construction may be unable to call the super( . . . ) with four arguments because before OS21 there was no four argument constructor. However, template processing engine 372 may generate a constructor that includes an programming platform version check, as shown in the example below.

```
public View(Context context, AttributeSet attrs,
       int defStyleAttr, int defStyleRes) {
    if (Build.VERSION.SDK_INT >= Build.VERSION_CODES.OS21) {
        super(context, attrs, defStyleAttr, defStyleRes);
    } else {
        super(context, attrs, defStyleAttr);
    }
}
```

Template generation engine 372 may copy the super( . . . ) call in the example above from template code 135 (possibly, immediately) before the constructor was introduced.

In some instances, a function within one of templates 134 instantiates a template object or accesses a template process. In these instances, template processing engine 372 may replace the template function calls with calls to the generated class. For example, a template in the below table will be replaced with the code shown in the immediately following table.

```
@SupportTemplate(Build.VERSION_CODES.OS17)
public class FooSupportOS17 extends Foo {
    public static FooSupportOS17 createInstance( ) {
        return new FooSupportOS17( );
    }
}
public class Foo extends OS.widget.Foo implements IFoo {
    public static Foo createInstance( ) {
        return new Foo( );
    }
}
```

Template processing engine 372 may also perform application processing, which occurs every time source code 118 is compiled and results in reading of the non-code artifacts of template 134 processing. During the initial compilation of source code 118, template processing engine 372 may modify all libraries and resources. Thereafter, during incremental compilation, template processing engine 372 may only function with respect to code and resources of source code 118 that has changed.

In some instances, template processing engine 372 may, during application processing, replace entire classes and/or interfaces. In other words, template processing engine 372 may replace the framework type with a different type every time a function from a substituted class is called, a field is referenced from the substituted class, or the substituted class is constructed. For example, template processing engine 372 may replace OS.app.Fragment with OS.support.v4.app.Fragement. Similar substitutions may be performed with respect to interfaces.

Template processing engine 372 may update source code 118 to change function calls. A templated function call that has been added will change how the code is called in source code 118. As such, whenever a virtual call is made (as opposed to a super.process( ) call), template processing engine 372 may update source code 118 to use the interface instead of the virtual call. To illustrate, considering the following example template for View.

```
@SupportTemplate(Build.VERSION_CODES.OS17)
public class ViewSupportOS17 extends View {
    private Rect mClipBounds;
    public void setClipBounds(Rect clipBounds) {
        mClipBounds = clipBounds;
    }
}
```

Source code 118 may include the following code.
    view.setClipBounds(newBounds);
Template processing engine 372 may change the foregoing fragment of source code 118 into the following code.
    ((IView)view).setClipBounds(newBounds);
When templates 134 replace the implementation for a function using a different signature (which may be referred to as overridden function replacement), template processing engine 372 may use the new signature in the function call, replacing all function calls using the old signature. Overridden function replacement may occur when template processing engine 372 uses support classes, and also when replacing a final function or when using @ReplaceMethod. Template processing engine 372 may also replace template static function calls with the generated static function calls.

In some instances, source code 118 may include a @TargetAPI, which effectively removes application level processing by template processing engine 372 for the @TargetAPI annotated fragment of code. Template processing engine 372 may not apply the processing for any template targeting the @TargetAPI or lower.

Template processing engine 372 may also perform resource manipulation after processing source code 118 in the manner described above. Template processing engine 372 may access one or more resource directories and copy the resources into a target directory, modifying those resources as required.

For example, template processing engine 372 may modify layout resources to allow support for earlier views as illustrated in the table below.

```
<LinearLayout xmlns:OS="http://schemas.OS.com/apk/res/OS"
    OS:orientation="vertical"
    OS:background="@drawable/my_vector_drawable"
    OS:layout_width="match_parent"
    OS:layout_height="match_parent">
    <TextView
        OS:elevation="4dp"
        OS:layout_width="wrap_content"
        OS:layout_height="wrap_content"
        OS:textSize="30sp"
        OS:text="Hello World"/>
</LinearLayout>
```

Template processing engine 372 may inflate the above layout to framework Views, while the OS:elevation attribute is not supported on APIs 132 corresponding to version 21 of the programming platform. As such, template processing engine 372 may modify all framework Views to use the Support implementations instead of the framework implementations. Template processing engine 372 may also push all unsupported OS namespace attributes to the application namespace, using a special prefix to avoid collision with other application namespaces.

Template processing engine 372 may copy a resource to a version-specific layout resource directory and modify the resource based on the changes per-API. For some version prior to 21, template processing engine 372 may modify the layout as shown below.

```
<OS.support.inject.widget.LinearLayout
    xmlns:OS="http://schemas.OS.com/apk/res/OS"
    xmlns:app="http://schemas.OS.com/apk/res-auto"
    OS:orientation="vertical"
    app:auto_support_background="@xml/my_vector_drawable"
    OS:layout_width="match_parent"
    OS:layout_height="match_parent">
  <OS.support.inject.widget.TextView
      app:auto_support_elevation="4dp"
      OS:layout_width="wrap_content"
      OS:layout_height="wrap_content"
      OS:textSize="30sp"
      OS:text="Hello World"/>
</LinearLayout>
```

Template processing engine 372 may also process drawables. The layout inflater will not allow custom drawables. As discussed during resource processing above, template processing engine 372 may specify attributes that need special processing, like background, as a parameter to @SupportTemplate. Template processing engine 372 may then copy the attribute to the user namespace with a special prefix. During processing, template processing engine 372 may replace the, as one example, OS:background attribute with an application namespace attribute such as app:auto_support_background. The constructor of the template may then read the attribute and load a vector drawable, for example, when needed. When not needed, the constructor of the template may read the framework-supported resource.

Some support library implementations already use application namespaced attributes. Template processing engine 372 may read a configuration file to convert use of the application namespaced attributes in the OS namespace to the expected application namespaced attributes. As such, template processing engine 372 may allow source code 118 to directly use the support library implementations, while also supporting automatic conversions.

With regard to styles, template processing engine 372 may copy material styles that are not supported on older versions of the programming platform to the support library. Template processing engine 372 may also modify references in source code 118 to the material styles to reference the copied material styles.

Template processing engine 372 may also output an XML file that includes a list of all Views used in layouts. The XML file may be useful in helping pro-guard strip View classes that may not be used in either code or layouts.

In some examples, functionality injection engine 116 may be optimized to reduce the number of functions generated as well as the number of copies of code. For example, template processing engine 372 may extract template classes to functions that work on Views instead of extending Views. Because most template function implementations do not directly access protected fields or processes, template processing engine 372 may extract the behavior code. When template functions access protected fields or processes, template processing engine 372 may extend the class in the way described above to produce public functions for accessing these protected fields or processes.

Generally, template processing engine 372 may copy template code 135 to the extracted classes without much change. Consider the following example template, which is copied without much change, resulting in the extracted class that follows in the second table below.

Template

```
@SupportTemplate(Build.VERSION_CODES.OS17)
public class ViewOS17 extends View {
    private Rect mClipBounds;
    public ViewOS17(Context context) {
        super(context);
    }
    public ViewOS17(Context context, AttributeSet attrs) {
        super(context, attrs);
    }
    public ViewOS17(Context context, AttributeSet attrs,
            int defStyleAttr) {
        super(context, attrs, defStyleAttr);
    }
    @Override
    public void setClipBounds(Rect clipBounds) {
        mClipBounds = clipBounds;
    }
    @Override
    public Rect getClipBounds( ) {
        return mClipBounds;
    }
}
```

Extracted Class

```
public class ViewOS17 extends ViewImpl {
    private Rect mClipBounds;
    public ViewOS17(View view, Context context) {
        super(view, context);
    }
    public ViewOS17(View view, Context context,
AttributeSet attrs) {
        super(view, context, attrs);
    }
    public ViewOS17(View view, Context context,
AttributeSet attrs,
            int defStyleAttr) {
        super(view, context, attrs, defStyleAttr);
    }
    @Override
    public void setClipBounds(Rect clipBounds) {
        if (Build.VERSION.SDK_INT <= 17) {
            mClipBounds = clipBounds;
        } else {
            super.setClipBounds(clipBounds);
        }
    }
    @Override
    public Rect getClipBounds( ) {
        if (Build.VERSION.SDK_INT <= 17) {
            return mClipBounds;
        } else {
            return super.getClipBounds( );
        }
    }
}
```

Template processing engine 372 may instantiate the extracted class in the constructors as shown below.

```
public class View extends OS.view.View implements
InjectedData {
    private Object mData;
    public View(Context context) {
        super(context);
```

```
        mData = new View17(this, context);
    }
    public View(Context context, AttributeSet attrs) {
        super(context, attrs);
        mData = new View17(this, context, attrs);
    }
    public View(Context context, AttributeSet attrs, int
defStyleAttr) {
        super(context, attrs, defStyleAttr);
        mData = new View17(this, context, attrs, defStyleAttr);
    }
    @Override
    public Object getInjectedView( ) {
        return mData;
    }
}
```

Instead of using IView to access processes, template processing engine 372 will change source code 118 such that IView will now supply the ViewImpl.

When there are multiple templates for the same target class, each extending the next, from newer version to older version, template processing engine 372 may process each in turn, merging the results. For example, the following provides a template for View at versions 17 and 21 of the programming platform.

```
public class View21 extends ViewImpl {
    //...
}
public class View17 extends View21 {
    //...
}
```

The supermost class (i.e., ViewImpl in this example) may implement all functions by call through to the view class implementation.

When there are templates for a class and its superclass also has a template, template processing engine 372 may extend the most specific generated superclass with the generated subclasses. Template processing engine 372 may generate the following when the TextView has a template for version 20 of the programming platform.

```
public class TextViewImpl extends View17 {
    // All TextView-specific implementations that call into
TextView class.
}
public class TextView20 extends TextViewImpl {
    // Template implementations of TextView
}
```

When modifying source code 118, template processing engine 372 may change calls to use the generated interface to use getInjectedData( ) thereby calling into the implementation directly. To illustrate, consider the following fragment of source code 118.

Rect clipBounds=view.getClipBounds( );
Template processing engine 372 may translate the foregoing fragment of source code 118 into the following code.
    ((ViewImpl)view.getInjectedData( ).getClipBounds( );

When injecting behavior in the manner described above, template processing engine 372 may override a function with a generated class. Consider the above example in which onDraw( ) has injected behavior from clip bounds, which is reproduced below for ease of reference.

```
@SupportTemplate(Build.VERSION_CODES.OS17)
public class View17 extends View {
    private Rect mClipBounds;
    @Override
    protected void onDraw(Canvas canvas) {
        boolean saved = mClipBounds != null;
        int saveCount = 0;
        if (saved) {
            saveCount = canvas.save(Canvas.CLIP_SAVE_FLAG);
            canvas.clipRect(mClipBounds);
        }
        super.onDraw(canvas);
        if (saved) {
            canvas.restoreToCount(saveCount);
        }
    }
}
```

In the generated class, the onDraw$Override( ) function will still be generated but template processing engine 372 may delegate the implementations to the Impl class as shown in the following code fragment.

```
public class View extends OS.view.View implements InjectedData {
    private View17 mData;
    @Override
    protected void onDraw(Canvas canvas) {
        mData.onDraw(canvas);
    }
    public void onDraw$Override(Canvas canvas) {
        super.onDraw(canvas);
    }
}
```

In this example, the ViewImpl.onDraw( ) function calls into the View.onDraw$Override( ) process.

As noted above, one of templates 134 may implement a process, which is further modified in another one of templates 134. Consider the following two templates shown in the table below.

```
@SupportTemplate(Build.VERSION_CODES.OS17)
public class View17 extends View {
    Rect mClipBounds;
    @Override
    public void setClipBounds(Rect clipBounds) {
        mClipBounds = clipBounds;
    }
    @Override
    public Rect getClipBounds( ) {
        return mClipBounds;
    }
}
@SupportTemplate(Build.VERSION_CODES.OS17)
public class TextView17 extends TextView {
    boolean mClipBoundsChanged = false;
    @Override
    public void setClipBounds(Rect clipBounds) {
        mClipBoundsChanged = true;
        super.setClipBounds(clipBounds);
    }
}
```

In the above table, TextView17 adds functionality to setClipBounds without reimplementing the setClipBounds process.

When multiple templates implement the same process, template processing unit 372 may replace the super.process( ) call with a call to the superclass's template implementation. When extracting the process, template processing unit 372 understands the call to the superclass's template implementation to be a call to the super.process( ).

When the call is not extracted, template processing unit 372 may rename the superclass function to avoid name conflicts. The following is illustrated in the example below where it is assumed that template processing unit 372 cannot extract the setClipBounds method and instead generates the following template code.

```
public class TextView extends OS.widget.TextView {
    private Rect mClipBounds;
    private boolean mClipBoundsChanged;
    @Override
    public void setClipBounds(Rect clipBounds) {
        switch (Build.VERSION.SDK_INT) {
            case 0:
            ...
            case 17: {
                mClipBoundsChanged = true;
                setClipBounds$View(clipBounds);
                return;
            }
            default: {
                setClipBounds$View(clipBounds);
                return;
            }
        }
    }
    public void setClipBounds$View(Rect clipBounds) {
        switch (Build.VERSION.SDK_INT) {
            case 0:
            ...
            case 17: {
                mClipBounds = clipBounds;
                return;
            }
            default: {
                super.setClipBounds(clipBounds);
                return;
            }
        }
    }
}
```

Template processing unit 372 may throw an error when one of templates 134 calls super.process( ) for a template prior to having the function introduced, and none of the superclasses to the function have a template for that version.

In some instances, the above described processing of templates 134 may increase the size of source code 118, as implementations may be duplicated across all framework subclasses of a template's superclass. Some code duplication may be avoided when non-trivial implementations are moved to static functions outside of templates 134.

The above processing may also duplicate functions across many framework classes, potentially increasing problems associated with multidexing. However, the above processing may decrease process overhead on the latest release of the programming platform. The above processing may also add to compilation time due to code transformation, but may be mitigated by support for incremental compilation.

While described primarily above with respect to View components and associated classes, processes, layouts, resources, fields, etc., the techniques described in this disclosure may be applied to any aspect of APIs. Furthermore, while not discussed in detail, functionality injection engine 116 may perform unit tests and integration tests for all template compilation and developer code transformation code. Functionality injection engine 116 may also perform tests that monitor performing of layout and drawing of View, TextView, ImageView, and FrameLayout as proxies for all Views and ViewGroups. These tests may be applied with respect to the latest (or, in other words, newest) API version to get representative examples of framework overhead, although it may also be useful to monitor the cost on older API versions, where features will be implemented, at least for comparison.

Figure 3:
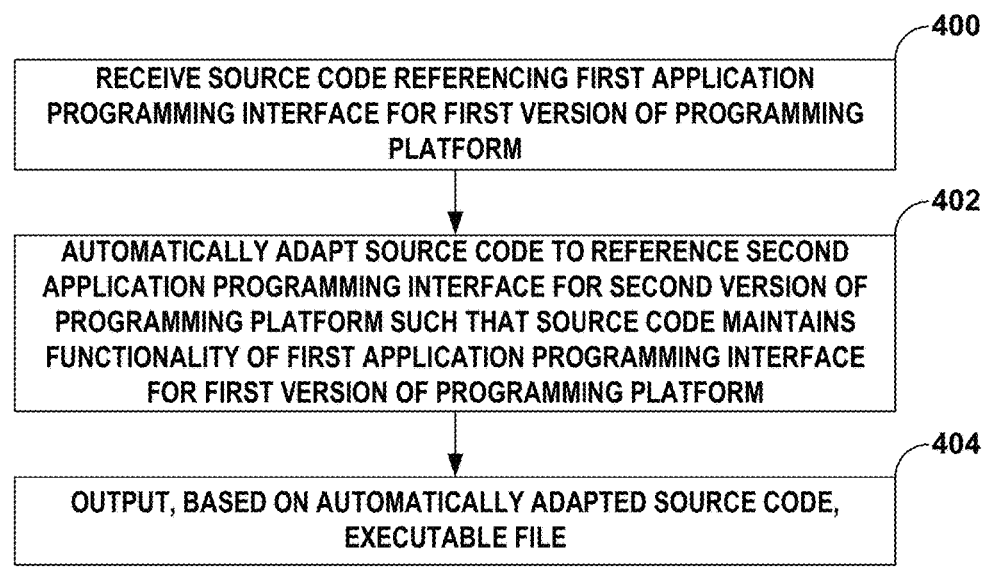
FIG. 3 is a flowchart illustrating example operation of builder computing system of FIG. 2 in performing various aspects of the functionality injection described in this disclosure.

FIG. 3 is a flowchart illustrating example operation of builder computing system 102 in performing various aspects of the functionality injection described in this disclosure. As shown in the example of FIG. 3, functionality injection engine 116 of builder computing system 102 may initially receive source code 118 referencing a first API 132N for a first version (e.g., a newer version) of a programming platform (400). Functionality injection engine 116 may, as described above, automatically adapt source code 118 to reference a second API 132O for a second version of the programming platform such that source code 118 maintains functionality of first API 132N for the first version of the programming platform (402). Functionality injection engine 116 may next output, based on the automatically adapted source code, an executable file 112 (404).

Figure 4:
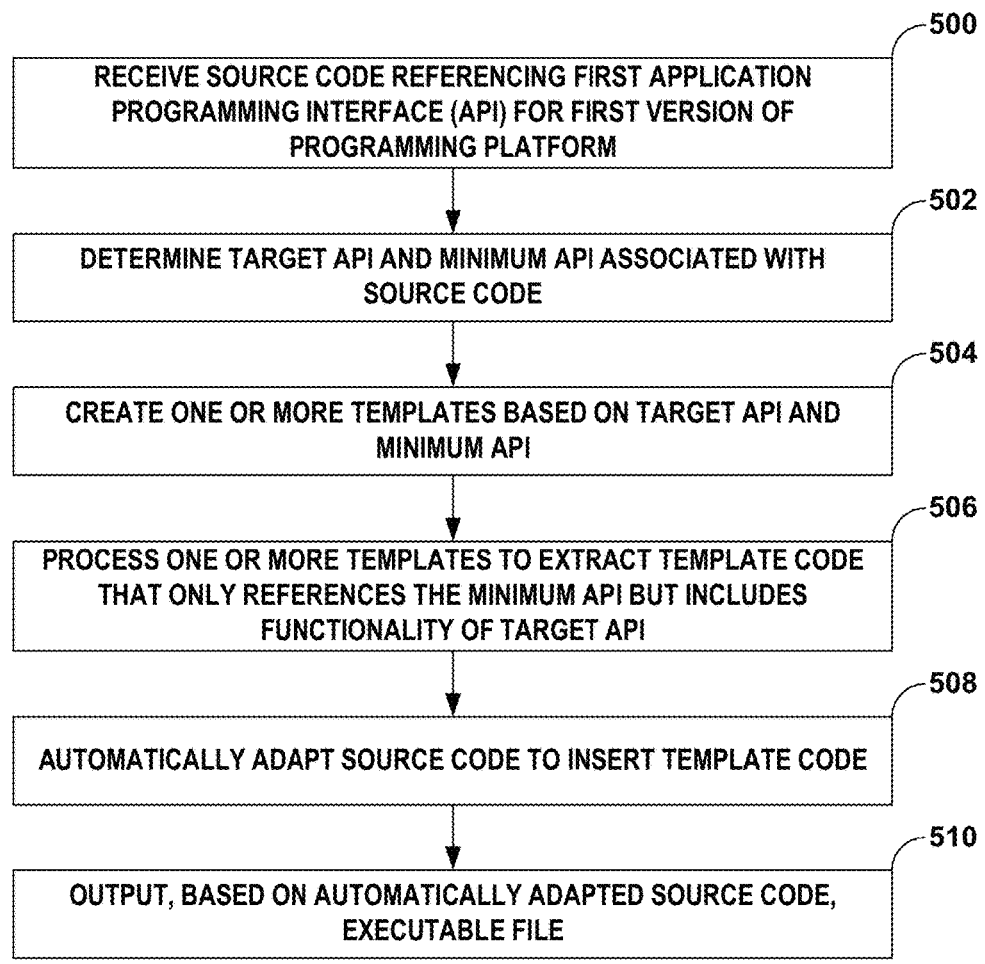
FIG. 4 is a flowchart illustrating, in more detail, example operation of builder computing system shown in FIG. 2 in performing various aspects of the functionality injection techniques described in this disclosure.

FIG. 4 is a flowchart illustrating, in more detail, example operation of builder computing system 102 in performing various aspects of the functionality injection techniques described in this disclosure. As shown in the example of FIG. 4, functionality injection engine 116 of builder computing system 102 may initially receive source code 118 referencing a first API 132N for a first version (e.g., a newer version) of a programming platform (500). Feature injection engine 116 may next invoke template creation engine 370, which may determine target API 380 and minimum API 382 associated with source code 118 (e.g., by way of resources 120) (502). Template creation engine 370 may create one or more of templates 134 based on target API 380 and minimum API 382 in the manner described above (504).

After creating templates 134, functionality injection engine 116 may invoke template processing engine 372, which processes the one or more of templates 134 to extract template code 135 that only references minimum API 382 but includes functionality of target API 380 (506). Template processing engine 372 may then automatically adapt source code 118 (e.g., in bytecode form) to insert template code 135 (508). In some instances, template processing engine 372 may add one or more of interfaces, classes that extend existing classes, selection control logic to select between function implements corresponding to APIs for different versions of the programming platform, resources, fields, constructors, etc. Template processing engine 372 may also adapt source code 118 to then call the new classes, processes, and constructors and reference the added resources fields, etc. Template processing engine 372 may output, based on the automatically adapted source code, an executable file 112 (510).

The following numbered examples may illustrate one or more aspects of the disclosure:

Example 1

A method comprises receiving, by one or more processors of a computing device, source code referencing a first application programming interface for a first version of a programming platform; automatically adapting, by the one or more processors, the source code to reference a second application programming interface for a second version of the programming platform such that the source code maintains functionality of the first application programming interface for the first version of the programming platform;

and outputting, by the one or more processors and based on the automatically adapted source code, an executable file.

Example 2

The method of example 1, further comprising compiling the source code to generate bytecode representative of the executable file, wherein automatically adapting the source code comprises automatically adapting the bytecode to reference the second application programming interface for the second version of the programming platform such that the source code maintains the functionality of the first application programming interface for the first version of the programming platform.

Example 3

The method of any combination of examples 1 and 2, wherein the first version of the programming platform is a newer version of the programming platform relative to the second version of the programming platform.

Example 4

The method of any combination of examples 1-3, wherein automatically adapting the source code comprises applying, to the source code, one or more templates to add template code that provides the functionality of the first application programming interface using references to the second application programming interface.

Example 5

The method of example 4, wherein the template code includes a template class that extends a class of the second application programming interface, the template class including a function that provides the functionality of the first application programming interface using the references to the second application programming interface, and wherein automatically adapting the source code comprises replacing at least one reference to the application programming interface for the first version of the programming platform with a call to the function of the template class.

Example 6

The method of example 5, wherein the computing device is a first computing device, and wherein the function includes selection control code configured to switch, when a version of the programming platform executed by a second computing device is the same as the second version of the programming platform, from executing a reference to the first application programming interface to executing the template code fragment that adds the functionality of the first application programming interface using functionality available in the second application programming interface.

Example 7

The method of any combination of examples 4 and 5, wherein applying the one or more templates comprises: determining a target application programming interface, wherein the first application programming interface includes the target application programming interface; determining a minimum application programming interface, wherein the second application programming interface comprises one of the minimum application programming interface or an intervening application programming interface released after the minimum application programming interface but before the target application programming interface; selecting the one or more templates based on the target application programming interface and the minimum application programming interface; and applying the one or more templates to the source code to add template code that provides the functionality of the first application programming interface using references to the second application programming interface.

8. The method of any combination of examples 1-7, wherein automatically adapting the source code comprises: applying, to the source code, a first template that adds first template code implementing the functionality of the first application programming interface using references to an intermediate application programming interface for an intermediate version of the programming platform, the intermediate version of the programming platform released prior to the first version of the programming platform and after the second version of the programming platform; and applying, to the source code, a second template that adds second template code implementing functionality of the intermediate application programming interface using references to the second application programming interface.

Example 9

A computing device comprises a memory configured to store source code referencing a first application programming interface for a first version of a programming platform; and one or more processors configured to: automatically adapt the source code to reference a second application programming interface for a second version of the programming platform such that the source code maintains functionality of the first application programming interface for the first version of the programming platform; and output, based on the automatically adapted source code, an executable file.

Example 10

The computing device of example 9, wherein the one or more processors are further configured to compile the source code to generate bytecode representative of the executable file, wherein the one or more processors are configured to automatically adapt the bytecode to reference the second application programming interface for the second version of the programming platform such that the source code maintains the functionality of the first application programming interface for the first version of the programming platform.

Example 11

The computing device of any combination of examples 9 and 10, wherein the first version of the programming platform is a newer version of the programming platform relative to the second version of the programming platform.

Example 12

The computing device of any combination of claims 9-11, wherein the one or more processors are configured to apply, to the source code, one or more templates to add template code that provides the functionality of the first application programming interface using references to the second application programming interface.

Example 13

The computing device of example 12, wherein the template code includes a template class that extends a class of the second application programming interface, the template class including a function that provides the functionality of the first application programming interface using the references to the second application programming interface, and wherein the one or more processors are configured to replace at least one reference to the application programming interface for the first version of the programming platform with a call to the function of the template class.

Example 14

The computing device of example 13, wherein the computing device is a first computing device, and wherein the function includes selection control code configured to switch, when a version of the programming platform executed by a second computing device is the same as the second version of the programming platform, from executing a reference to the first application programming interface to executing the template code fragment that adds the functionality of the first application programming interface using functionality available in the second application programming interface.

Example 15

The computing device of any combination of examples 12-14, wherein the one or more processors are configured to: determine a target application programming interface, wherein the first application programming interface includes the target application programming interface; determine a minimum application programming interface, wherein the second application programming interface comprises one of the minimum application programming interface or an intervening application programming interface released after the minimum application programming interface but before the target application programming interface; select the one or more templates based on the target application programming interface and the minimum application programming interface; and apply the one or more templates to the source code to add template code that provides the functionality of the first application programming interface using references to the second application programming interface.

Example 16

The computing device of any combination of examples 9-15, wherein the one or more processors are configured to: apply, to the source code, a first template that adds first template code implementing the functionality of the first application programming interface using references to an intermediate application programming interface for an intermediate version of the programming platform, the intermediate version of the programming platform released prior to the first version of the programming platform and after the second version of the programming platform; and apply, to the source code, a second template that adds second template code implementing functionality of the intermediate application programming interface using references to the second application programming interface.

Example 17

A non-transitory computer-readable storage medium having stored thereon instructions that, when executed, cause one or more processors of a computing device to: receive source code referencing a first application programming interface for a first version of a programming platform; automatically adapt the source code to reference a second application programming interface for a second version of the programming platform such that the source code maintains functionality of the first application programming interface for the first version of the programming platform; and output, based on the automatically adapted source code, an executable file.

Example 18

The non-transitory computer-readable storage medium of example 17, further comprising instructions that, when executed, cause the one or more processors to: compile the source code to generate bytecode representative of the executable file; and automatically adapt the bytecode to reference the second application programming interface for the second version of the programming platform such that the source code maintains the functionality of the first application programming interface for the first version of the programming platform.

Example 19

The non-transitory computer-readable storage medium of any combination of examples 17 and 18, wherein the first version of the programming platform is a newer version of the programming platform relative to the second version of the programming platform.

Example 20

The non-transitory computer-readable storage medium of any combination of examples 17-19, further comprising instructions that, when executed, cause the one or more processors to apply, to the source code, one or more templates to add template code that provides the functionality of the first application programming interface using references to the second application programming interface.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    receiving, by one or more processors of a computing device, source code referencing a target application programming interface for a first version of a programming platform;
    determining, by the one or more processors, a target application programming interface associated with the source code;
    creating, by the one or more processors, one or more templates based on the target application programming interface and a minimum application programming interface of a second version of the programming platform;
    processing, by the one or more processors, the one or more templates to extract template code that references the minimum application programming interface but includes functionality of the target application programming interface;
    automatically adapting, by the one or more processors, the source code to insert the template code that provides the functionality of the target application programming interface using references to the minimum application programming interface; and
    outputting, by the one or more processors and based on the automatically adapted source code, an executable file.

2. The method of claim 1, further comprising compiling the source code to generate bytecode representative of the executable file,
    wherein automatically adapting the source code comprises automatically adapting the bytecode to insert the template code.

3. The method of claim 1, wherein the first version of the programming platform is a newer version of the programming platform relative to the second version of the programming platform.

4. The method of claim 1,
    wherein the template code includes a template class that extends a class of the second application programming interface, the template class including a function that provides the functionality of the first application programming interface using the references to the second application programming interface, and
    wherein automatically adapting the source code comprises inserting the template code to replace at least one reference to the application programming interface for the first version of the programming platform with a call to the function of the template class.

5. The method of claim 4,
    wherein the computing device is a first computing device, and
    wherein the function includes selection control code configured to switch, when a version of the programming platform executed by a second computing device is the same as the second version of the programming platform, from executing a reference to the first application programming interface to executing the template code fragment that adds the functionality of the first application programming interface using functionality available in the second application programming interface.

6. The method of claim 1, wherein applying the one or more templates comprises
    selecting the one or more templates based on the target application programming interface and the minimum application programming interface.

7. The method of claim 1, wherein processing the one or more templates comprises:
    applying, to the source code, a first template to obtain first template code implementing the functionality of the first application programming interface using references to an intermediate application programming interface for an intermediate version of the programming platform, the intermediate version of the programming platform released prior to the target version of the programming platform and after the minimum version of the programming platform; and applying, to the source code, a second template to obtain second template code implementing functionality of the intermediate application programming interface using references to the minimum application programming interface; and wherein automatically adapting the source code comprises automatically adding, to the source code, the first template code and the second template code.

8. A computing device comprising:

a memory configured to store source code referencing a target application programming interface for a first version of a programming platform; and one or more processors configured to:

determine a target application programming interface associated with the source code;

create one or more templates based on the target application programming interface and a minimum application programming interface of a second version of the programming platform;

process the one or more templates to extract template code that references the minimum application programming interface but includes functionality of the target application programming interface;

automatically adapt, by the one or more processors, the source code to insert the template code that provides the functionality of the target application programming interface using references to the minimum application programming interface; and output, based on the automatically adapted source code, an executable file.

9. The computing device of claim 8, wherein the one or more processors are further configured to compile the source code to generate bytecode representative of the executable file, and wherein the one or more processors are configured to automatically adapt the bytecode to interest the template code.

10. The computing device of claim 8, wherein the first version of the programming platform is a newer version of the programming platform relative to the second version of the programming platform.

11. The computing device of claim 8, wherein the template code includes a template class that extends a class of the second application programming interface, the template class including a function that provides the functionality of the first application programming interface using the references to the second application programming interface, and wherein the one or more processors are configured to insert the template code to replace at least one reference to the application programming interface for the first version of the programming platform with a call to the function of the template class.

12. The computing device of claim 11, wherein the computing device is a first computing device, and wherein the function includes selection control code configured to switch, when a version of the programming platform executed by a second computing device is the same as the second version of the programming platform, from executing a reference to the first application programming interface to executing the template code fragment that adds the functionality of the first application programming interface using functionality available in the second application programming interface.

13. The computing device of claim 8, wherein the one or more processors are configured to select the one or more templates based on the target application programming interface and the minimum application programming interface.

14. The computing device of claim 8, wherein the one or more processors are configured to:

apply, to the source code, a first template that adds first template code implementing the functionality of the first application programming interface using references to an intermediate application programming interface for an intermediate version of the programming platform, the intermediate version of the programming platform released prior to the target version of the programming platform and after the minimum version of the programming platform; and apply, to the source code, a second template that adds second template code implementing functionality of the intermediate application programming interface using references to the minimum application programming interface.

15. A non-transitory computer-readable storage medium having stored thereon instructions that, when executed, cause one or more processors of a computing device to:

determine a target application programming interface associated with the source code;

create one or more templates based on the target application programming interface and a minimum application programming interface of a second version of the programming platform;

process the one or more templates to extract template code that references the minimum application programming interface but includes functionality of the target application programming interface;

automatically adapt, by the one or more processors, the source code to insert the template code that provides the functionality of the target application programming interface using references to the minimum application programming interface; and output, based on the automatically adapted source code, an executable file.

16. The non-transitory computer-readable storage medium of claim 15, further comprising instructions that, when executed, cause the one or more processors to:

compile the source code to generate bytecode representative of the executable file; and automatically adapt the bytecode to reference the second application programming interface for the second version of the programming platform such that the source code maintains the functionality of the first application programming interface for the first version of the programming platform.

17. The non-transitory computer-readable storage medium of claim 15, wherein the first version of the programming platform is a newer version of the programming platform relative to the second version of the programming platform.

* * * * *